United States Patent
Kelly et al.

(10) Patent No.: US 11,959,820 B2
(45) Date of Patent: Apr. 16, 2024

(54) PULSER PLATE BALANCING

(71) Applicant: Honda Motor Co., Ltd., Tokyo (JP)

(72) Inventors: Sean M. Kelly, Hilliard, OH (US);
Philip R. Weber, Columbus, OH (US);
Hunter F. Trefz, Eudora, KS (US)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 17/204,230

(22) Filed: Mar. 17, 2021

(65) Prior Publication Data

US 2022/0299393 A1 Sep. 22, 2022

(51) Int. Cl.
*F16F 15/32* (2006.01)
*F16C 41/00* (2006.01)
*G01M 1/32* (2006.01)

(52) U.S. Cl.
CPC .............. *G01M 1/32* (2013.01); *F16C 41/007* (2013.01)

(58) Field of Classification Search
CPC ........ F16F 15/28; F16F 15/283; F16F 15/286; F16F 15/32; G01M 1/16; G01M 1/24; G01M 1/36; G01M 1/32; G01M 15/06; G01M 15/11; G01M 15/12; F02P 7/06; F02P 7/0631; F02P 7/07; F02P 7/077; F16C 41/007; F16C 41/00; G01L 5/0042; G01L 5/0028; G01L 5/00
See application file for complete search history.

(56) References Cited

U.S. PATENT DOCUMENTS

| | | | |
|---|---|---|---|
| 3,979,161 A | 9/1976 | Kremer et al. |
| 4,116,175 A | 9/1978 | Sand |
| 4,121,112 A | 10/1978 | Hartig |
| 4,138,976 A | 2/1979 | Crall |

(Continued)

FOREIGN PATENT DOCUMENTS

| CN | 203223516 U | 10/2013 |
|---|---|---|
| CN | 203780034 U | 8/2014 |

(Continued)

OTHER PUBLICATIONS

Notice of Allowance of U.S. Appl. No. 16/271,087 dated Aug. 13, 2021, 15 pages.

(Continued)

*Primary Examiner* — George C Jin
*Assistant Examiner* — Teuta B Holbrook
(74) *Attorney, Agent, or Firm* — RANKIN, HILL & CLARK LLP

(57) ABSTRACT

Embodiments for balancing a pulser plate are provided. In one embodiment, a pulser plate includes a plurality of teeth, an indexing gap, and a mass modifier. The teeth of the plurality of teeth define a sensed behavior of the pulser plate. The indexing gap separates a first tooth and a second tooth of the plurality of the teeth. The indexing gap is symmetrical about a first axis on a face of the pulser plate. A second axis defines a proximate side of the pulser plate having the indexing gap and a distal side of the pulser plate. The first axis and the second axes are orthogonal to a pulser plate axis and intersect at a center. The mass modifier includes a first mass modifier on the proximate side of the pulser plate to balance the mass of the pulser plate about the center and does not change the sensed behavior.

20 Claims, 7 Drawing Sheets

(56) References Cited

U.S. PATENT DOCUMENTS

| | | |
|---|---|---|
| 4,518,918 A | 5/1985 | Avery |
| 4,528,471 A | 7/1985 | Baumann |
| 4,535,289 A | 8/1985 | Abe et al. |
| 4,827,800 A | 5/1989 | Pedersen et al. |
| 4,935,698 A | 6/1990 | Kawaji et al. |
| 5,070,727 A | 12/1991 | David et al. |
| 5,084,674 A | 1/1992 | Lachmann et al. |
| 5,182,943 A | 2/1993 | Fukui et al. |
| 5,444,370 A | 8/1995 | Wu |
| 5,623,412 A | 4/1997 | Masson et al. |
| 5,694,040 A | 12/1997 | Plagens |
| 5,794,171 A | 8/1998 | Bryant et al. |
| 5,856,922 A | 1/1999 | Jehanno |
| 5,870,688 A | 2/1999 | Kanbara et al. |
| 6,012,551 A | 1/2000 | Raab |
| 6,062,071 A | 5/2000 | Henn et al. |
| 6,175,233 B1 | 1/2001 | McCurley et al. |
| 6,199,426 B1 | 3/2001 | Shibagaki |
| 6,341,253 B1 | 1/2002 | Honda |
| 6,346,808 B1 | 2/2002 | Schroeder |
| 6,404,188 B1 | 6/2002 | Ricks |
| 6,474,278 B1 | 11/2002 | Davis et al. |
| 6,490,914 B1 | 12/2002 | Brandenburg et al. |
| 6,566,867 B1 | 5/2003 | Schroeder et al. |
| 6,609,498 B2 | 8/2003 | Mathews et al. |
| 6,737,861 B2 | 5/2004 | Lantto |
| 6,752,009 B2 | 6/2004 | Minich et al. |
| 6,978,666 B1 | 12/2005 | Wu et al. |
| 7,069,774 B2 | 7/2006 | Nakamura et al. |
| 7,096,593 B2 | 8/2006 | Schmied |
| 7,116,096 B2 | 10/2006 | Waszkowski et al. |
| 7,135,856 B2 | 11/2006 | Eidenvall et al. |
| 7,167,793 B1 | 1/2007 | Gibson et al. |
| 7,458,164 B2 | 12/2008 | Perret et al. |
| 7,942,041 B2 | 5/2011 | Takeuchi |
| 8,085,036 B2 | 12/2011 | Ausserlechner |
| 8,120,351 B2 | 2/2012 | Rettig et al. |
| 8,978,453 B2 | 3/2015 | Fayyad et al. |
| 9,297,321 B2 | 3/2016 | Hawken et al. |
| 9,297,346 B2 | 3/2016 | Wang |
| 9,303,972 B2 | 4/2016 | Oberhauser et al. |
| 9,465,087 B2 | 10/2016 | Klotzbuecher et al. |
| 9,568,310 B2 | 2/2017 | Stuckert et al. |
| 9,765,711 B2 | 9/2017 | Martinson |
| 9,938,921 B2 | 4/2018 | Hagari et al. |
| 10,036,653 B2 | 7/2018 | Hernandez-Oliver |
| 10,184,860 B2 | 1/2019 | Schweikert et al. |
| 10,234,513 B2 | 3/2019 | Vig et al. |
| 10,254,103 B2 | 4/2019 | Taylor et al. |
| 10,260,906 B2 | 4/2019 | Liu et al. |
| 10,428,752 B2 | 10/2019 | Mazenc et al. |
| 2002/0093202 A1 | 7/2002 | Downs et al. |
| 2003/0168044 A1 | 9/2003 | Rupp et al. |
| 2004/0020472 A1 | 2/2004 | Bayerle et al. |
| 2004/0115017 A1 * | 6/2004 | Trionfetti ............... G01M 1/36 409/141 |
| 2005/0061293 A1 | 3/2005 | Chung et al. |
| 2005/0285592 A1 | 12/2005 | Taniguchi et al. |
| 2006/0089784 A1 | 4/2006 | Spicer et al. |
| 2006/0150938 A1 | 7/2006 | Kramer |
| 2007/0068015 A1 | 3/2007 | Perret et al. |
| 2007/0170913 A1 | 7/2007 | Yokotani et al. |
| 2008/0022760 A1 | 1/2008 | McDaniel et al. |
| 2008/0027622 A1 | 1/2008 | McDaniel |
| 2008/0125929 A1 | 5/2008 | Prokhorov |
| 2008/0173079 A1 | 7/2008 | McGee et al. |
| 2009/0276143 A1 | 11/2009 | Rackmil et al. |
| 2009/0301179 A1 | 12/2009 | Moessner |
| 2010/0072988 A1 | 3/2010 | Hammerschmidt et al. |
| 2010/0107747 A1 | 5/2010 | Rolew et al. |
| 2011/0048350 A1 | 3/2011 | Simpson et al. |
| 2011/0213545 A1 | 9/2011 | Oaten et al. |
| 2012/0271536 A1 | 10/2012 | Hamedovic et al. |
| 2013/0073182 A1 | 3/2013 | Lindsay et al. |
| 2013/0082693 A1 | 4/2013 | Boehl |
| 2013/0096872 A1 | 4/2013 | Boehl |
| 2013/0151194 A1 | 6/2013 | Hawken et al. |
| 2013/0180505 A1 | 7/2013 | Schüle et al. |
| 2014/0019084 A1 | 1/2014 | Rolew et al. |
| 2014/0060486 A1 | 3/2014 | Maezawa |
| 2014/0084906 A1 | 3/2014 | Ruigrok et al. |
| 2014/0107904 A1 | 4/2014 | Nefzer et al. |
| 2014/0232379 A1 | 8/2014 | Nazarian et al. |
| 2015/0354479 A1 | 12/2015 | Lindsay et al. |
| 2015/0369195 A1 | 12/2015 | Wang |
| 2017/0102291 A1 | 4/2017 | Gladel et al. |
| 2017/0138281 A1 | 5/2017 | Utley et al. |
| 2017/0217427 A1 | 8/2017 | Weiß et al. |
| 2017/0276740 A1 | 9/2017 | Schmitt et al. |
| 2017/0292898 A1 | 10/2017 | Schweikert et al. |
| 2017/0299467 A1 | 10/2017 | Johansson et al. |
| 2017/0363512 A1 | 12/2017 | Ognibene |
| 2018/0195453 A1 | 7/2018 | Zhang |
| 2018/0230865 A1 | 8/2018 | Brown |
| 2018/0298836 A1 | 10/2018 | Stowasser et al. |
| 2018/0355815 A1 | 12/2018 | Braun et al. |
| 2019/0086236 A1 | 3/2019 | Binder et al. |
| 2019/0301897 A1 | 10/2019 | Kisaichi et al. |
| 2020/0064156 A1 | 2/2020 | Hirano et al. |

FOREIGN PATENT DOCUMENTS

| | | | |
|---|---|---|---|
| CN | 206556614 U | 10/2017 | |
| CN | 111692962 A * | 9/2020 | ........... F02D 41/009 |
| DE | 3541624 A1 | 5/1987 | |
| DE | 3829545 A1 | 8/1989 | |
| DE | 3928726 A1 | 3/1991 | |
| DE | 4039062 C1 | 6/1992 | |
| DE | 4309245 C2 * | 8/1997 | .............. F02P 7/061 |
| DE | 102010041444 | 3/2012 | |
| EP | 0071885 | 2/1983 | |
| EP | 1544622 | 6/2005 | |
| FR | 2843614 A1 | 2/2004 | |
| FR | 2894665 | 6/2007 | |
| GB | 2343955 | 5/2000 | |
| JP | H09231889 | 9/1997 | |
| JP | 2004060450 A | 2/2004 | |
| JP | 2006063836 A * | 3/2006 | |
| JP | 2010216455 A * | 9/2010 | |
| JP | 5724337 B2 | 5/2015 | |
| WO | WO2018042911 | 3/2018 | |
| WO | WO-2019049849 A1 * | 3/2019 | .............. F02B 77/08 |

OTHER PUBLICATIONS

Notice of Allowance of U.S. Appl. No. 16/657,134 dated Jun. 3, 2021, 29 pages.

"2011-17 Mustang Ford Performance High RPM Competition Ignition Pulse Ring 5.0." Late Model Restoration. (Accessed Jun. 16, 2020.).

"BMW S14 140mm Race with Integral 60-2 Trigger." TTV Racing. (Accessed Jun. 16, 2020.).

"Tone Ring." Rick's Free Auto Repair Advice. (Accessed Jun. 16, 2020.).

Mavrigian, Mike. "Installation and Removal Tips for LS Engine 24x or 58x Reluctor Wheels." On All Cylinders. Apr. 19, 2018. (Accessed Jun. 16, 2020.).

Notice of Allowance of U.S. Appl. No. 16/987,889 dated Jul. 8, 2021, 31 pages.

Notice of Allowance of U.S. Appl. No. 17/062,277 dated Jul. 23, 2021, 30 pages.

Office Action of U.S. Appl. No. 16/271,087 dated Mar. 30, 2021, 28 pages.

* cited by examiner

PULSER PLATE BALANCING

BACKGROUND

A crankshaft sensor is used to determine the position and timing of an engine of a vehicle. In particular, as a pulser plate of the crankshaft turns, the crankshaft sensor detects tooth pulses corresponding to the teeth of the pulser plate. The tooth pulses correspond to angular positions of the crankshaft so that the appropriate engine timing can be determined based on the position of the crank pulse wheel in combination with camshaft position information. In some embodiments, the teeth of the pulser plate may be missing forming an indexing gap. The crankshaft sensor can detect the indexing gap, which allows the position of the pulser plate to be determined. However, the indexing gap as well as other pulser plate characteristics may cause the pulser plate to be unbalanced.

BRIEF DESCRIPTION

According to one or more aspects, a pulser plate includes a plurality of teeth, an indexing gap, and a mass modifier. The plurality of teeth are arranged on the periphery of the pulser plate. The teeth of the plurality of teeth are readable by a crankshaft sensor to define a sensed behavior of the pulser plate. The indexing gap separates a first tooth and a second tooth of the plurality of the teeth in a circumferential direction of the pulser plate. The indexing gap extends across a first axis on a face of the pulser plate. A second axis, orthogonal to the first axis on the pulser plate defines a proximate side of the pulser plate having the indexing gap and a distal side of the pulser plate. The first axis and the second axis are orthogonal to a pulser plate axis and intersect at a center. The mass modifier includes a first mass modifier on the proximate side of the pulser plate that balances the mass of the pulser plate about the center and does not change the sensed behavior of the pulser plate.

According to one or more aspects, a pulser plate includes a plurality of teeth, an indexing gap, and a mass modifier. The plurality of teeth are arranged on the periphery of the pulser plate. The teeth of the plurality of teeth are readable by a crankshaft sensor to define a sensed behavior of the pulser plate. The indexing gap separates a first tooth and a second tooth of the plurality of the teeth in a circumferential direction of the pulser plate. The indexing gap extends across a first axis on a face of the pulser plate. A second axis, orthogonal to the first axis on the pulser plate defines a proximate side of the pulser plate having the indexing gap and a distal side of the pulser plate. The first axis and the second axis are orthogonal to a pulser plate axis and intersect at a center. The mass modifier on the proximate side of the pulser plate balances the mass of the pulser plate about the center and does not change the sensed behavior of the pulser plate.

According to one or more aspects, a pulser plate includes a plurality of teeth, an indexing gap, and a mass modifier. The plurality of teeth are arranged on the periphery of the pulser plate. The teeth of the plurality of teeth are readable by a crankshaft sensor to define a sensed behavior of the pulser plate. The indexing gap separates a first tooth and a second tooth of the plurality of the teeth in a circumferential direction of the pulser plate. The indexing gap extends across a first axis on a face of the pulser plate. A second axis, orthogonal to the first axis on the pulser plate defines a proximate side of the pulser plate having the indexing gap and a distal side of the pulser plate. The first axis and the second axis are orthogonal to a pulser plate axis and intersect at a center. The mass modifier on the distal side of the pulser plate balances the mass of the pulser plate about the center and does not change the sensed behavior of the pulser plate.

DETAILED DESCRIPTION

Figure 1:
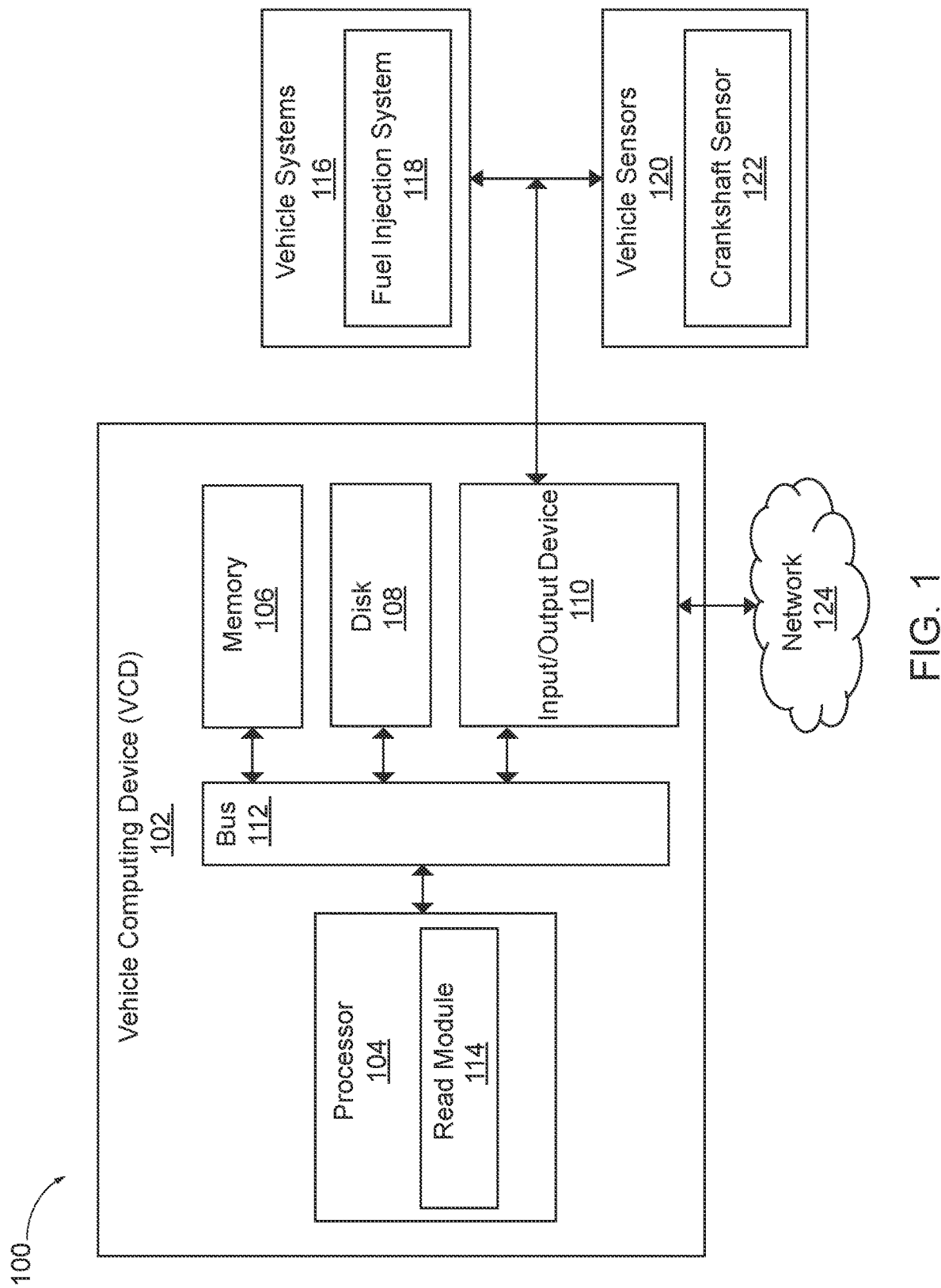
FIG. 1 is a schematic diagram of an operating environment for implementing systems and methods for pulser plate balancing according to one or more embodiments.

The indexing gap and/or various tooth characteristics can cause the pulser plate to be dynamically unbalanced. When several masses rotate in different planes, the centrifugal forces, in addition to being out of balance, form couples. A system of rotating masses is in dynamic balance when there does not exist any resultant centrifugal force or resultant couples. When the pulser plate is dynamically unbalanced, the pulser plate may not rotate adequately, for example due to vibration, and/or the crankshaft sensor may be unable to correctly detect the tooth pulses, thereby altering the sensed behavior of the pulser plate.

Because the engine may rely on the sensed behavior of the pulser plate, the pulser plate described herein is dynamically balanced without modifying the sensed behavior. In particular, mass modifiers are applied to the pulser plate to change the mass such that the pulser plate is in dynamic balance. The mass modifiers are out of the sensing range of the crankshaft sensor so that changes do not need to be made to accommodate the crankshaft sensor or sensing software due to the mass modifiers. For example, the mass modifier may include one large tooth outside of the sensing range of the crankshaft sensor. As another embodiment, teeth of differing mass are inserted into the pulser plate opposite and/or next to the indexing gap for improved balance. The mass modifiers are not detected by the crankshaft sensor 122 and/or differentiable from the sensed behavior of the pulser plate.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Definitions

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a mobile programmable agent bus that interconnects components inside a mobile programmable agent using protocols such as Media Oriented Systems Transport (MOST), Controller Area network (CAN), Local Interconnect Network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more computing devices (e.g., computer, personal digital assistant, cellular telephone, network device, mobile programmable agent, computing device, infrastructure device, security device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicle-to-everything (V2X) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "database," as used herein can refer to table, a set of tables, a set of data stores and/or methods for accessing and/or manipulating those data stores. Some databases can be incorporated with a disk as defined below.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor" as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle control system" and/or "vehicle system," as used herein can include, but is not limited to, any automatic or manual systems that can be used to enhance the vehicle, driving, and/or safety. Exemplary vehicle systems include, but are not limited to: an engine control system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), an electronic pretensioning system, a monitoring system, a vehicle suspension system, a sensory system, an interior or exterior camera system among others.

I. System Overview

Figure 2:
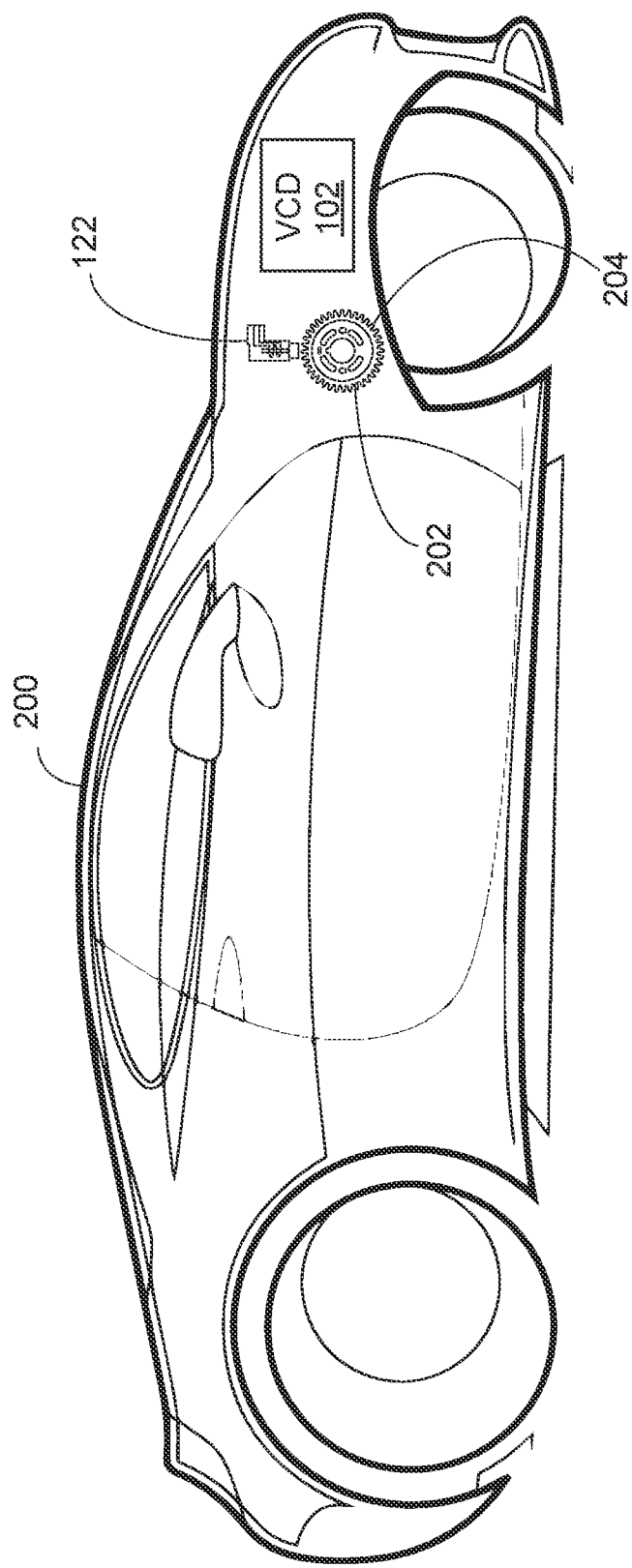
FIG. 2 is a schematic diagram of a crank pulse wheel and a crankshaft sensor according to one or more embodiments.

Referring now to the drawings, wherein the showings are for purposes of illustrating one or more exemplary embodiments and not for purposes of limiting same. FIG. 1 is a schematic diagram of an operating environment 100 for pulser plate balancing. The components of operating environment 100, as well as the components of other systems, hardware architectures, and software architectures discussed herein, can be combined, omitted, or organized into different architectures for various embodiments. Further, the components of the operating environment 100 can be implemented with or associated with a vehicle 200 and a pulser plate 202, as shown in FIG. 2.

In the illustrated embodiment of FIG. 1, the operating environment 100 includes a vehicle computing device (VCD) 102 with provisions for processing, communicating and interacting with various components of a vehicle, such as vehicle 200, and other components of the operating environment 100. In one embodiment, the VCD 102 can be implemented in the vehicle 200, for example, as part of a telematics unit, a head unit, a navigation unit, an infotainment unit, an electronic control unit, among others. In other embodiments, the components and functions of the VCD 102 can be implemented remotely from the vehicle 200, for example, with a portable device (not shown) or another device connected via a network (e.g., a network 124).

Generally, the VCD 102 includes a processor 104, a memory 106, a disk 108, and an input/output (I/O) interface 110, which are each operably connected for computer communication via a bus 112 and/or other wired and wireless technologies. The I/O interface 110 provides software and hardware to facilitate data input and output between the components of the VCD 102 and other components, networks, and data sources, which will be described herein. Additionally, the processor 104 may include a read module 114.

The VCD 102 is also operatively connected for computer communication (e.g., via the bus 112 and/or the I/O interface 110) to one or more vehicle systems 116. The vehicle systems 116 can include, but are not limited to, any automatic or manual systems that can be used to enhance the vehicle 200, driving, and/or safety. Here, as an example, the vehicle systems 116 include a fuel injection system 118. The fuel injection system 118 delivers fuel to a combustion engine of the vehicle 200 based on synchronized timing to propel the vehicle 200.

The vehicle systems 116 include and/or are operably connected for computer communication to various vehicle sensors 120. The vehicle sensors 120 provide and/or sense information associated with the vehicle 200, the vehicle environment, and/or the vehicle systems 116. Here, the vehicle sensors 120 include a crankshaft sensor 122 for detecting the teeth on a pulser plate 202. In some embodiments, the crankshaft sensor is a Hall Effect sensor with a digital output or a variable reluctance sensor having an analog output. In particular, the crankshaft sensor may measure the magnetic flux corresponding to the teeth on the crank pulse wheel. The pulser plate 202 has a total number of teeth that extend outward from the main body of the pulser plate 202. A tooth of the total number of teeth may have a profile that is polyhydric, conical, spherical, helical, beveled, crowned, cantilevered, angled, rounded, and/or irregular shaped, among others.

The vehicle sensors 120 can include, but are not limited to, image sensors, such as cameras, optical sensors, radio sensors, electromagnetic sensors, etc. mounted to the interior or exterior of the vehicle 200. The vehicle sensors 120 may detect characteristics of the engine, such as the position, timing, velocity, etc. of the components. Accordingly, the vehicle sensors 120 are operable to sense a measurement of data associated with the vehicle 200, the vehicle environment, and/or the vehicle systems 116, and generate a data signal indicating said measurement of data. These data signals can be converted into other data formats (e.g., numerical) and/or used by the vehicle systems 116 and/or the VCD 102 to generate other data metrics and parameters. For example, the data signals may convert the sensor data to values that can be used by the VCD 102. It is understood that the sensors can be any type of sensor, for example, acoustic, electric, magnetic, radio, environmental, optical, imaging, light, pressure, force, thermal, temperature, proximity, among others.

The VCD 102 is also operatively connected for computer communication to the network 124. It is understood that the connection from the I/O interface 110 and to the network 124 can be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. The network 124 is, for example, a data network, the Internet, a wide area network or a local area network. The network 124 serves as a communication medium to various remote devices (e.g., databases, web servers, remote servers, application servers, intermediary servers, client machines, other portable devices).

The application of systems for and methods for pulser plate balancing are described with respect to the vehicle 200. As shown in FIG. 2, the vehicle 200 includes the operating environment 100, the pulser plate 202, and the crankshaft sensor 122 described above. The pulser plate 202 has teeth, such as tooth 204, having a predetermined geometry defined by at least on tooth characteristic. However, the pulser plate 202 is exemplary in nature and may have more or fewer teeth with different profiles, geometries, and/or configurations on the pulser plate 202. Because the teeth of the pulser plate 202 have different configurations and characteristics, the placement of the teeth around the pulser plate 202 may cause the pulser plate 202 to be imbalanced. Detailed embodiments for balancing a pulser plate, such as the pulser plate 202, using the system and network configuration discussed above will now be discussed in detail.

II. Embodiments for Pulser Plate Balancing

Figure 3:
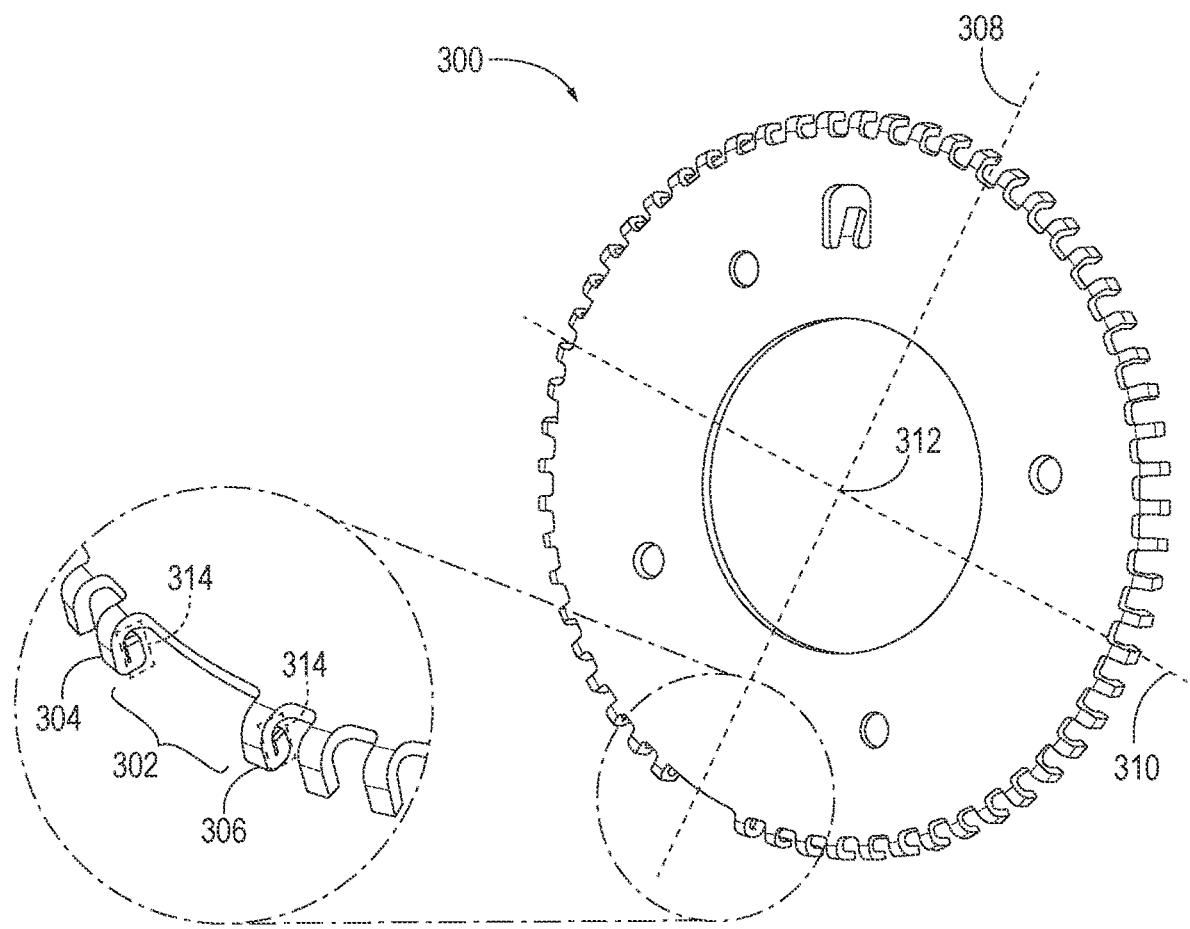
FIG. 3 is a schematic diagram of a balanced pulser plate having an indexing gap according to one or more embodiments.

FIG. 3 is a schematic diagram of a balanced pulser plate 300 having an indexing gap 302 according to one or more embodiments. A plurality of teeth are arranged on the periphery of the pulser plate 300. The teeth of the plurality of teeth are readable by the crankshaft sensor 122 to define a sensed behavior of the pulser plate 300. Tooth types for N number of teeth of the pulser plate 202 may be identified based on at least one tooth characteristic. The identification processes described below are performed by, coordinated by, and/or facilitated by the read module 114. The at least one tooth characteristic is a physical geometric feature of at least some of the teeth on the pulser plate 300 that make the teeth differentiable by the crankshaft sensor 122.

The tooth geometry may include the size and/or shape of the teeth on the pulser plate 300 or physical geometric features of the pulser plate 300 itself. For example, the tooth geometry may include height, irregular formations (e.g., outcroppings, protrusions, nodules, etc.), thickness, depth, surface angle, surface patterning, voids, holes, cavities, and/or guides, among others. The tooth characteristics may also include material-based differences, differences in radiation profiles of the teeth, spectral differences on the electromagnetic spectrum, and/or optical differences, among others that can be sensed by the vehicle sensors 120.

In one embodiment, the plurality of teeth may have the same tooth characteristic is a physical geometric feature of at least some of the teeth on the pulser plate 300 such that the teeth are not differentiable by the crankshaft sensor 122 but the teeth and spaces between the teeth are differentiable. Furthermore, the crankshaft sensor 122 detects the lack of teeth in the indexing gap 302 as sensed behavior of the pulser plate. The indexing gap 302 separates the first tooth 304 and the second tooth 306 of the plurality of the teeth in a circumferential direction of the pulser plate 300. The indexing gap 302 extends across a first axis 308 on a face of the pulser plate 300. A second axis 310, orthogonal to the first axis 308, on the pulser plate 300 defines a proximate side of the pulser plate 300 having the indexing gap 302 and a distal side of the pulser plate 300. The first axis 308 and the second axis 310 are orthogonal to a pulser plate axis and intersect at a center 312.

Suppose that the plurality of teeth have protrusions that causes the profile of the teeth to include at least one angle. In particular, teeth of the plurality of teeth include a main body extending radially from a perimeter of the pulser plate 300 and a protrusion. The profile of the protrusion of teeth may be cantilevered with respect to the main body of the teeth extending from the pulser plate 300. As one embodiment, the protrusion may extend in an axial direction from the main body. For example, the teeth have a protrusion that extend away from the main body in the same direction. The crankshaft sensor 122 may detect both the profile of the teeth and the physical features of the pulser plate 300. The crankshaft sensor 122 may include a plurality of sensors, such as an optical sensor and a Hall Effect sensor that detect either the main body and/or the protrusion of the teeth.

A periphery of a pulser plate having a plurality of teeth with approximately equivalent mass that are equally spaced with the exception of the indexing gap 302, may result in a dynamically imbalanced pulser plate. To dynamically balance the pulser plate 300, the pulser plate 300 includes at least one mass modifier. In some embodiments, the mass modifier may include a first mass modifier and a second mass modifier. As shown in FIG. 3, a first mass modifier is included on the proximate side of the pulser plate 300 to balance the mass of the pulser plate 300 about the center 312.

Figure 6:
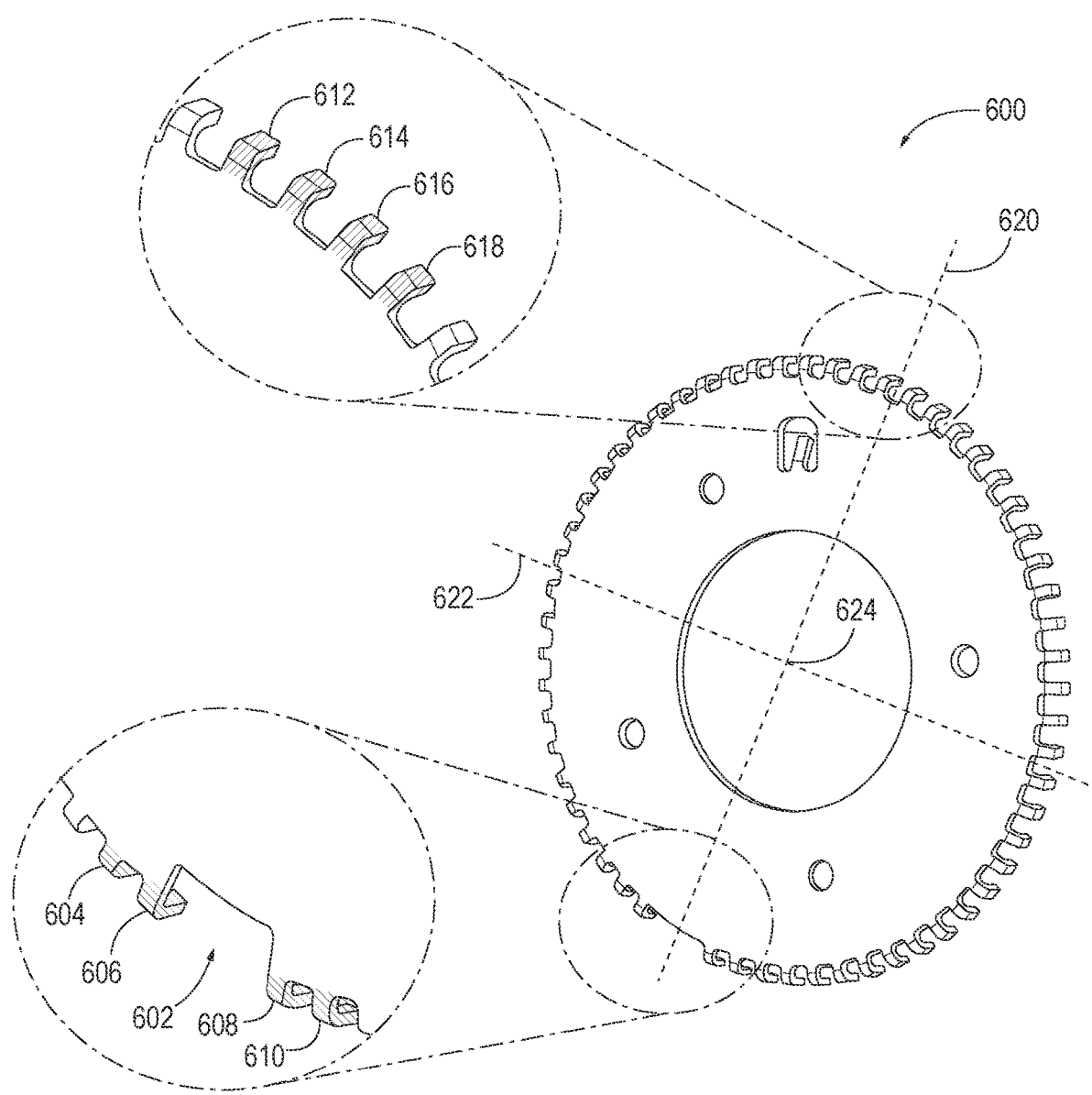
FIG. 6 is a schematic diagram of a balanced pulser plate with teeth having different mass according to one or more embodiments.

In particular, a first mass modifier may be included in at least one tooth of the plurality of teeth. For example, the subset of teeth may include the first tooth 304 and the second tooth 306. The first mass modifier may add additional mass to at least one tooth of the plurality of teeth. The additional mass may include a portion of a tooth that is only included on the at least one tooth of the plurality of teeth as is shown in FIG. 3 or based on the material of at least one tooth of the plurality of teeth as shown in FIG. 6. The additional mass is included on the proximate side of the pulser plate 300 with the indexing gap 302 to offset the absence of mass of the indexing gap 302, thereby dynamically balancing the pulser plate 300.

In FIG. 3, the first mass modifier is additional mass in the form of an additional projection 314. The first mass modifier is added to at least one tooth in the plurality of teeth such that the mass of the at least one tooth is greater than the mass of each tooth of the plurality of teeth. Here, the mass of each tooth in the subset of teeth, the first tooth 304 and the second tooth 306, may have a larger mass than any of the remaining teeth in the plurality of teeth.

The first mass modifier may be an addition to the subset of teeth of the plurality of teeth. In one embodiment, the protrusion has a first protrusion end affixed to the main body of a tooth and a second protrusion end opposite the first protrusion end. The additional projection 314 is affixed to the second protrusion end. The additional projection 314 may extend from the second protrusion end towards the main body. The additional projection 314 may be formed such that the additional projection 314 is arranged closer to the center 312 than the protrusion. For example, the protrusion may have a first protrusion face proximate to the body of the pulser plate 300 and a second protrusion face opposite the first protrusion face. The additional projection 314 may extend along the first protrusion face. In some embodiments, the additional projection 314 may be in contact with the first protrusion face. The additional projection 314 may therefore appear as a bend or a fold in the protrusion of the subset of teeth. In another embodiment, the addition projection 314 may be formed from the protrusion such that the protrusion of the subset of teeth is wider than the remaining plurality of teeth.

In an embodiment in which the additional projection 314 is formed under the protrusion, adjacent the first protrusion face, the additional projection 314 is positioned so as to be out of sensor range of the crankshaft sensor 122 or merely detected with the projection. For example, the crankshaft sensor 122 may have a sensing axis that the additional projection does not intersect. Thus, the additional projection 314 is either not detected by the crankshaft sensor 122 or not detected independently of an otherwise detectable portion of a tooth, such as the protrusion. Accordingly, the additional projection 314 is not read by the read module 114 and therefore, does not change the sensed behavior of the pulser plate 300.

Figure 4:
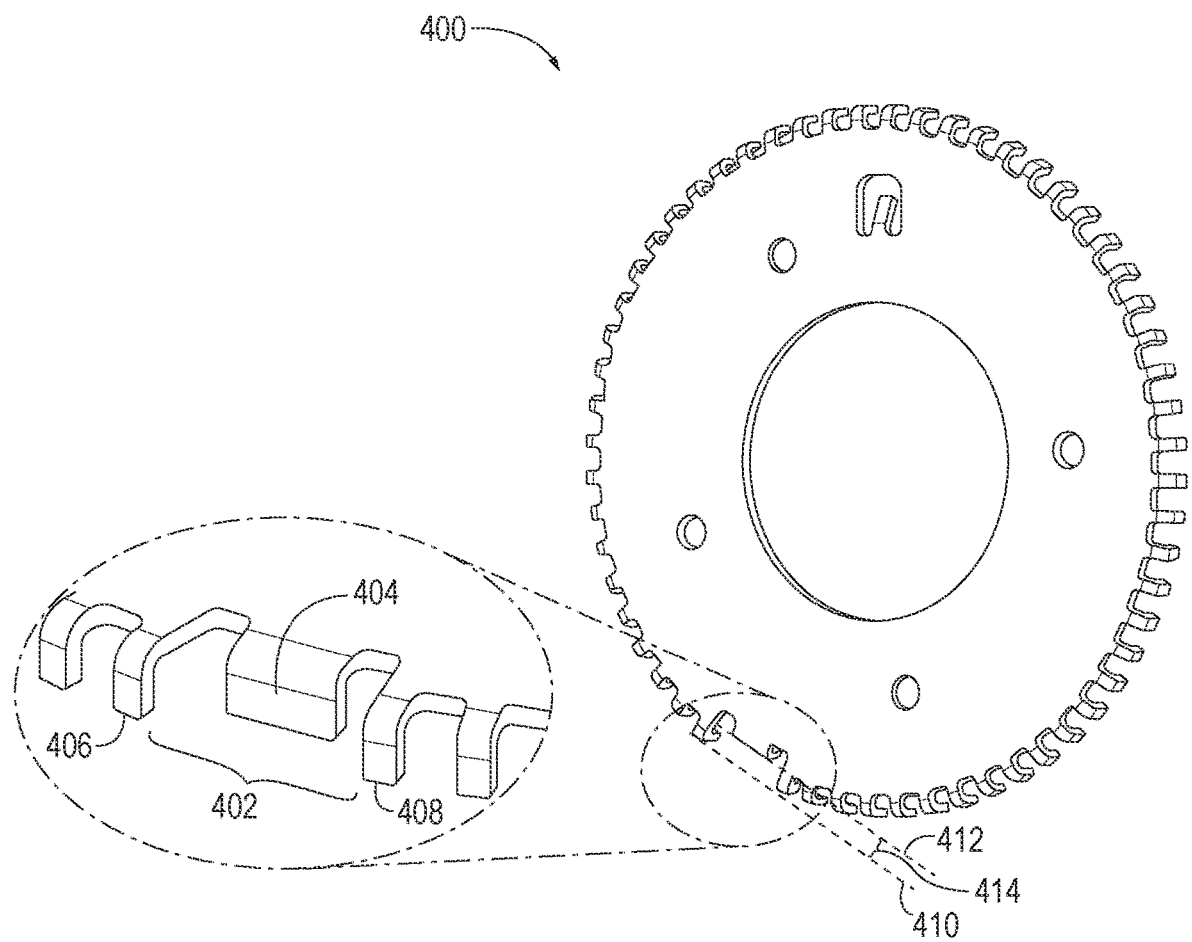
FIG. 4 is a schematic diagram of another balanced pulser plate having an indexing gap according to one or more embodiments.

FIG. 4 is a schematic diagram of another balanced pulser plate 400 having an indexing gap 402 with a gap tooth 404. The indexing gap 402 separates teeth of the plurality of teeth, specifically, the first tooth 406 and the second tooth 408. The plurality of teeth about the periphery of the pulser plate 400 extend to a sensing axis 410. The crankshaft sensor 122 detects teeth that intersect the sensing axis 410. Accordingly, the plurality of teeth can be sensed by the crankshaft sensor 122.

The gap tooth 404 is arranged between the first tooth 406 and the second tooth 408 in the circumferential direction of the pulser plate 400. In some embodiment, the gap tooth 404 may have a larger width than any tooth of the plurality of teeth. The size of the gap tooth 404 may be correlated with the size of the indexing gap 402. For example, suppose the indexing gap 402 corresponds to width of two missing teeth on the periphery of the pulser plate 400. The width of the gap tooth 404 may then correspond to the width of two teeth. Additionally or alternatively, the mass of the gap tooth may be correlated with the mass of teeth missing from the plurality of teeth. Continuing the example from above, the mass of the gap tooth 404 may then approximately correspond to the mass of two teeth.

The gap tooth 404 extends to a gap axis 412. The gap axis 412 does not intersect the sensing axis 410 detectable by the crankshaft sensor 122. The sensing axis 410 may be separated from the gap axis 412 by a distance 414. Accordingly, the first mass modifier may be the gap tooth 404 that does not extend to the sensing axis 410, and therefore is not detected by the crankshaft sensor 122. Accordingly, the gap tooth 404 is not read by the read module 114 and therefore, does not change the sensed behavior of the pulser plate 400. However, the gap tooth 404 offsets the absence of mass resulting from the indexing gap 402.

As shown in FIG. 4, the plurality of teeth extend radially from a perimeter of the pulser plate 400 and so does the gap tooth 404. Accordingly, the gap tooth 404 is arranged in the indexing gap 402. As another embodiment, the gap tooth may also be formed in the body of the pulser plate as shown in FIG. 5.

Figure 5:
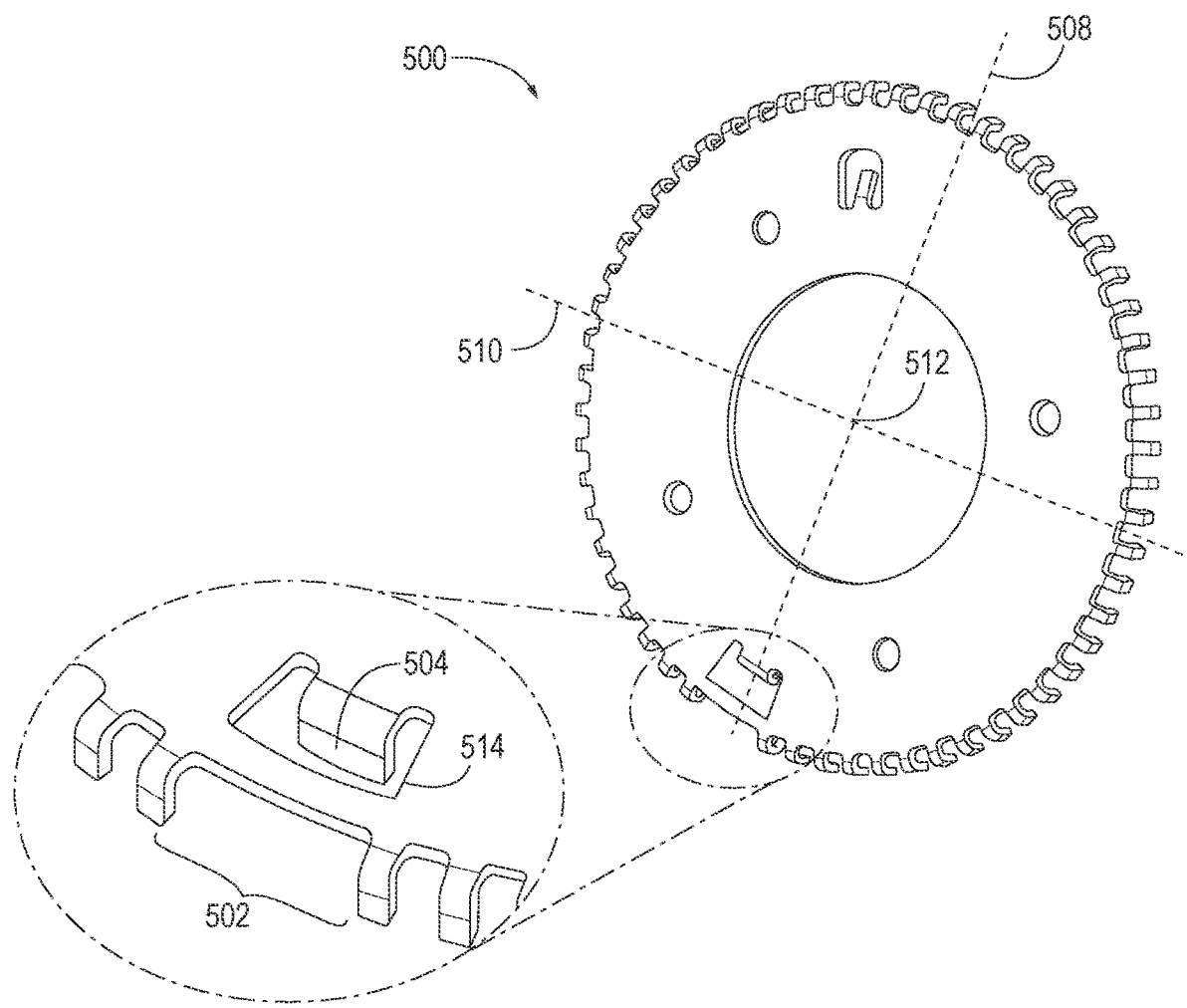
FIG. 5 is a schematic diagram of a balanced pulser plate having an indexing gap according to one or more embodiments.

Similar to the previously described embodiments, in FIG. 5, the pulser plate 500 also includes a plurality of teeth, an indexing gap 502, and a gap tooth 504. The indexing gap 502 extends across a first axis 508 on a face of the pulser plate 500. A second axis 510, orthogonal to the first axis 508, on the pulser plate 500 defines a proximate side of the pulser plate 500 having the indexing gap 502 and a distal side of the pulser plate 500. The first axis 508 and the second axis 510 are orthogonal to a pulser plate axis and intersect at a center 512.

The pulser plate 500 defines a gap hole 514 positioned radially between the center 512 and the indexing gap 502. An edge defines a perimeter of the gap hole 514 is formed from the pulser plate 500. The gap tooth 504 extends from the edge into the gap hole 514. Accordingly, the gap tooth 504 extends radially from the edge of the gap hole 514. The gap hole 514 may be on the proximate side of the pulser plate 500. The gap hole 514 may extend across the first axis 508 on a face of the pulser plate 500.

The gap tooth 504 may extend from a location of the edge radially closest to the center 512. The gap hole 514 may be any shape and have a number of edges corresponding to that shape. In some embodiments, the gap hole 514 is substantially rectangular. Accordingly, the gap hole 514 may have four sides, and thus four edges. The gap tooth 504 may extend from the edge of the rectangular shape that is radially closest to the center 512.

FIG. 6 is a schematic diagram of a balanced pulser plate with a plurality of teeth having different mass according to one or more embodiments. The pulser plate 600 may include an indexing gap 602 and a plurality of teeth including a first subset of teeth and a second subset of teeth. The first subset of teeth includes a first proximate tooth 604, a second proximate tooth 606, a third proximate tooth 608, and fourth proximate tooth 610. The second subset of teeth includes a first distal tooth 612, a second distal tooth 614, a third distal tooth 616, and a fourth distal tooth 618.

The indexing gap 602 extends across a first axis 620 on a face of the pulser plate 600. A second axis 622, orthogonal to the first axis 620, on the pulser plate 600 defines a proximate side of the pulser plate 600 having the indexing gap 602 and a distal side of the pulser plate 600. The first axis 620 and the second axis 622 are orthogonal to a pulser plate axis and intersect at a center 624.

The first mass modifier may also be a tooth characteristic of a tooth of the plurality of teeth. For example, the first mass modifier may include teeth in the first subset being formed from a high density material having an increased density compared to a pulser plate material of the pulser plate 600. The pulser plate material is the material that the remaining teeth not in the first subset and/or the second subset of teeth is formed from. The pulser plate material may also be the material forming the main body of the pulser plate 600. The main body and the protrusion of teeth in the first subset of teeth may be formed from the high density material. At least one of the teeth of the first subset of teeth may be adjacent the indexing gap 602, such as the second proximate tooth 606 and the third proximate tooth 608.

In addition or as an alternative to the first mass modifier, the mass modifier may include a second mass modifier. The second mass modifier alters the mass on the distal side of the pulser plate 600 to balance the mass of the pulser plate 600 about the center 624. The second mass modifier may include teeth in the second subset of teeth including the first distal tooth 612, the second distal tooth 614, the third distal tooth 616, and the fourth distal tooth 618. The teeth in the second subset of teeth may be formed from a low density material having a decreased density compared to the pulser plate material. For example, the main body and the protrusion of teeth in the second subset are formed from the low density material.

Figure 7:
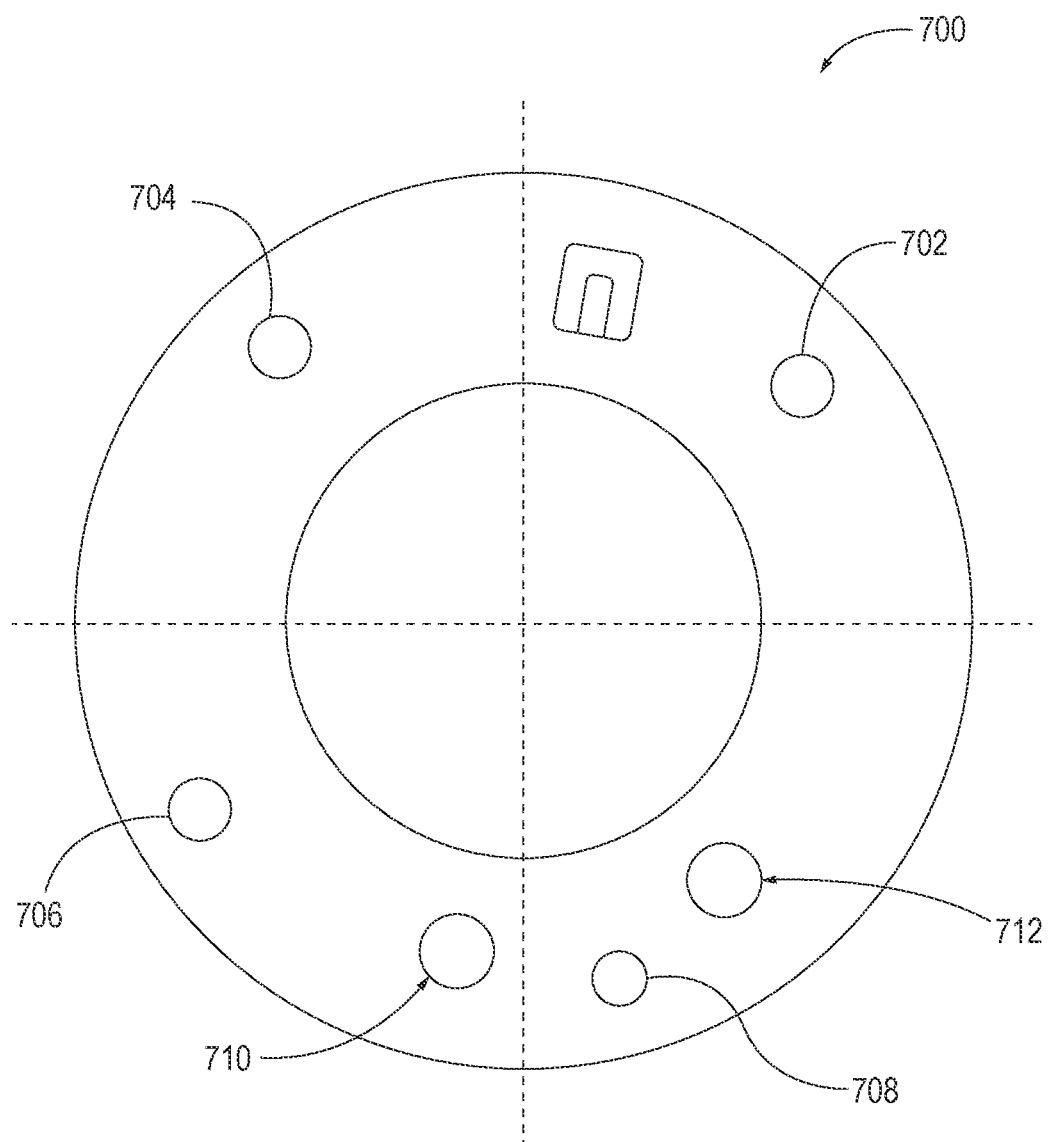
FIG. 7 is a schematic diagram of a balanced pulser plate having balance holes according to one or more embodiments.

Not all pulser plates may include an indexing gap. For example, FIG. 7 is a schematic diagram of a balanced pulser plate having balance holes according to one or more embodiments. The second mass modifier may also be a hole on the distal side of the pulser plate 700. The pulser plate 700 may include mounting holes 702, 704, 706, and 708. The pulser plate 700 may also include a at least one gap hole such as a first balancing hole 710 and a second balancing hole 712. The at least one gap hole may reduce mass on a distal side of the pulser plate 700. The edges of a gap holes define a circumference of the gap hole are surrounded by the pulser plate 700. For example, the first balancing hole 710 and the second balancing hole 712 by the body of the pulser plate 700. The balancing holes may redistribute the mass on the distal side of the pulser plate to balance the mass of the pulser plate 700.

The embodiments of the pulser plates described herein are dynamically balanced without modifying the sensed behavior. In particular, the mass modifiers are applied to the pulser plates to change the mass such that the pulser plate is in dynamic balance without changing the sensing behavior of the pulser plate.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various embodiments of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A pulser plate comprising:
a plurality of teeth arranged on a periphery peripheral radial edge of the pulser plate, wherein teeth of the plurality of teeth are readable by a crankshaft sensor to define a sensed behavior of the pulser plate, and wherein each of the teeth includes a proximal base disposed on the peripheral radial edge and a distal end radially spaced apart from the peripheral radial edge;
an indexing gap separating a first tooth and a second tooth of the plurality of the teeth in a circumferential direction of the pulser plate, wherein the indexing gap extends across a first axis on a face of the pulser plate, wherein a second axis orthogonal to the first axis on the pulser plate defines a proximate side of the pulser plate having the indexing gap and a distal side of the pulser plate, wherein the first axis and the second axis are orthogonal to a pulser plate axis and intersect at a center; and
a mass modifier includes a first mass modifier on the proximate side of the pulser plate to balance the mass of the pulser plate about the center, wherein the mass modifier does not change the sensed behavior of the pulser plate, wherein the mass modifier is added to at least one tooth of the plurality of teeth and is spaced apart radially from the peripheral radial edge.

2. The pulser plate of claim 1, wherein the at least one tooth to which the mass modifier is added includes at least the first tooth and the second tooth.

3. The pulser plate of claim 2 wherein the mass modifier is added to only the first tooth and the second tooth.

4. The pulser plate of claim 2 wherein the mass modifier is added to additional teeth of the plurality of teeth in addition to the first tooth and the second tooth.

5. The pulser plate of claim 1, wherein each tooth teeth of the plurality of teeth includes a main body extending radially from the peripheral radial edge to the distal end and a protrusion disposed on the distal end spaced apart radially from the peripheral radial edge extending in an axial direction from the main body.

6. The pulser plate of claim 5, wherein the protrusion is a first protrusion, and wherein the mass modifier is second protrusion, wherein the first protrusion has a first protrusion first end affixed to the main body and a first protrusion second end opposite the first protrusion first end and axially spaced apart from the first protrusion end, and wherein the second protrusion is affixed to the second protrusion second end.

7. The pulser plate of claim 6, wherein the second protrusion extends from the second protrusion second end radially towards the center of the pulser plate and then axially towards the main body.

8. The pulser plate of claim 7 wherein a distal end of the second protrusion is axially spaced apart from the main body and radially spaced part from the peripheral radial edge.

9. The pulser plate of claim 5, wherein the first mass modifier formed from a high density material having an increased density compared to a pulser plate material of the pulser plate, and wherein the main body and a protrusion of teeth in the subset of teeth are formed from the high density material.

10. The pulser plate of claim 9, wherein the subset includes the first tooth and the second tooth.

11. The pulser plate of claim 5 wherein the mass modifier is added to a subset of teeth of the plurality of teeth.

12. The pulser plate of claim 1, wherein the mass modifier further includes a second mass modifier that alters the mass on the distal side of the pulser plate to balance the mass of the pulser plate about the center.

13. The pulser plate of claim 12, wherein the second mass modifier is a hole on the distal side of the pulser plate, and wherein edges that define a circumference of the hole are surrounded by the pulser plate.

14. The pulser plate of claim 12, wherein teeth of the plurality of teeth include a main body extending radially from a perimeter of the pulser plate and a protrusion extending in an axial direction from the main body, and wherein a subset of teeth of the plurality of teeth include the second mass modifier.

15. The pulser plate of claim 14, wherein the second mass modifier is a low density material having a decreased density compared to a pulser plate material of the pulser plate.

16. A pulser plate comprising:
a plurality of teeth arranged on a periphery of the pulser plate, wherein teeth of the plurality of teeth are readable by a crankshaft sensor to define a sensed behavior of the pulser plate;
an indexing gap separating a first tooth and a second tooth of the plurality of the teeth in a circumferential direction of the pulser plate, wherein the indexing gap extends across a first axis on a face of the pulser plate, wherein a second axis orthogonal to the first axis on the pulser plate defines a proximate side of the pulser plate having the indexing gap and a distal side of the pulser plate, wherein the first axis and the second axis are orthogonal to a pulser plate axis and intersect at a center; and a mass modifier on the proximate side of the pulser plate balances the mass of the pulser plate about the center, the mass modifier disposed on at least one tooth at a location radially spaced apart from a base of said at least one tooth.

17. The pulser plate of claim 16, wherein the plurality of teeth extend to a sensing axis to be sensed by the crankshaft sensor, wherein the mass modifier is a gap tooth arranged between the first tooth and the second tooth in the circumferential direction of the pulser plate, and wherein the gap tooth does not extend to the sensing axis.

18. The pulser plate of claim 16, wherein the mass modifier is disposed on at least one tooth in the plurality of teeth such that the mass of the at least one tooth is greater than a mass of each tooth of the plurality of teeth.

19. A pulser plate comprising:
   a plurality of teeth arranged on a periphery of the pulser plate, wherein teeth of the plurality of teeth are readable by a crankshaft sensor to define a sensed behavior of the pulser plate;
   an indexing gap separating a first tooth and a second tooth of the plurality of the teeth in a circumferential direction of the pulser plate; and
   a mass modifier disposed on at least one of the plurality of teeth to balance the mass of the pulser plate about a center thereof, wherein the mass modifier extends from a distal end of said at least one of the plurality of teeth in a radial direction toward the center of the pulser plate.

20. The pulser plate of claim 19 wherein the mass modifier includes a first segment extending from the distal end of the at least one of the plurality of radially teeth in a radial direction toward the center of the pulser plate and a second segment extending axially from a first segment distal end toward the pulser plate.

\* \* \* \* \*